UNITED STATES PATENT OFFICE.

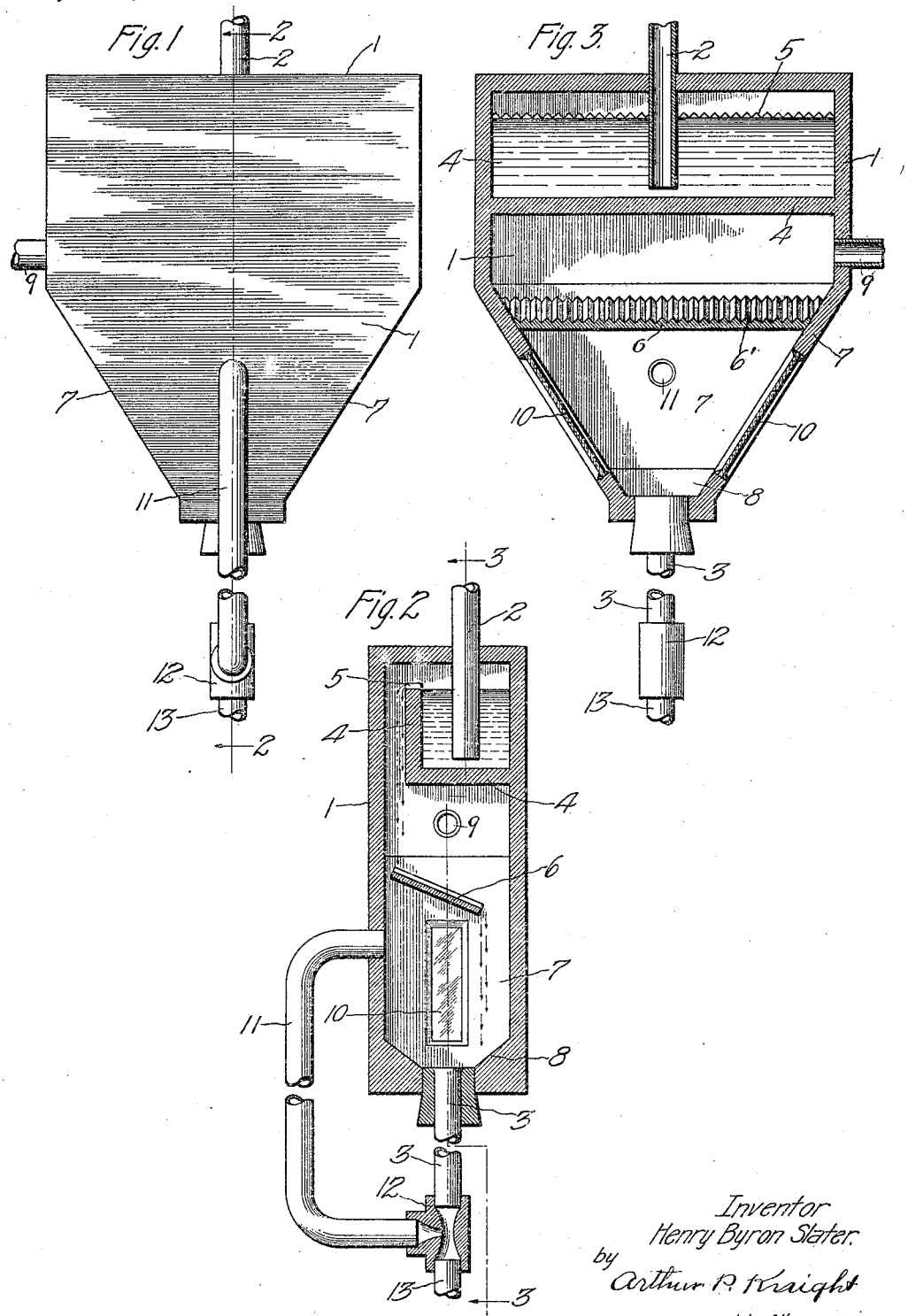

HENRY BYRON SLATER, OF LOS ANGELES, CALIFORNIA.

GAS-ABSORPTION APPARATUS.

1,272,321.                    Specification of Letters Patent.     Patented July 9, 1918.

Application filed February 19, 1916. Serial No. 79,341.

*To all whom it may concern:*

Be it known that I, HENRY BYRON SLATER, a citizen of the United States, residing at Los Angeles, in the county of Los Angeles, State of California, have invented a new and useful Gas-Absorption Apparatus, of which the following is a specification.

This invention relates to means for bringing a gas into contact with a liquid in such manner as to facilitate absorption of the gas in the liquid, and it is particularly intended for promoting the absorption of chlorin in leaching solutions so as to regenerate said solutions for use in leaching ores.

The main object of the present invention is to provide for effective exposure of the liquid to the chlorin in a comparatively limited space. A further object of the invention is to provide an absorbing device of this character which will take the place of the usual absorption towers at considerable saving in expense of installation and operation. A further object of the invention is to utilize the liquid as the means for producing the circulation or draft of the chlorin into and through the apparatus and through the liquid therein.

The accompanying drawings illustrate an embodiment of the invention, and referring thereto—

Figure 1 is a side elevation of the apparatus.

Fig. 2 is a section thereof on line 2—2 in Fig. 1.

Fig. 3 is a section on line 3—3 in Fig. 2.

The apparatus comprises a box or casing 1 of any suitable material resistant to the action of chlorin and other constituents of the leaching solution, said box being provided with an inlet pipe 2 for the solution, at its top, and an outlet pipe 3 for the solution, at its bottom. A trough or tank 4 is provided at the upper portion of said box in such position that the inlet pipe 2 will dip into the liquid in said trough. One edge of said trough is serrated or formed with notches indicated at 5, so that the overflow over said edge will be distributed uniformly along that edge. The wall 4' of said trough which is provided with said overflow edge, is directly over an inclined deflector plate 6, the upper face of which is preferably corrugated or grooved as shown at 6'. The lower portion of the box 1 is formed with converging end walls 7 and with an inclined bottom 8 by which the liquid is conducted to the discharge or outlet pipe 3. Windows 10 of glass may be provided in the inclined end walls 7.

A chlorin supply pipe 9 communicating with a source of chlorin supply, for example, an electrolytic cell, opens into the casing 1 above the deflector plate 6. An aspirating pipe 11 leads from the side of the box below the deflector plate 6 to an aspirator 12, said outlet pipe 3 also communicating with said aspirator and said ejector member having an outlet pipe 13 for discharging the liquid to suitable receiving means such as a storage tank or leaching vat.

In the operation of the apparatus the liquid, for example, barren leaching solution is supplied to the pipe 2, for example from a suitable storage tank or from suitable pumping means (not shown) and filling the trough 4, runs over the serrated edge 5 of said trough and runs down to the bottom of the trough from which it drips or runs in a cascade or descending sheet consisting of drops of liquid. The descending liquid is then caught by the deflector plate 6 and conducted thereby to the other side of the box and allowed to drip from said deflector plate in another cascade or sheet of descending drops. The solution collects in the bottom of the box 1 and runs out through the outlet pipe 3 and the aspirator 12 and is discharged through the discharge pipe 13 and in passing through said aspirator 12 it tends to draw chlorin through the pipe 11 which acts as an aspirator pipe producing a condition of partial vacuum in the interior of the box 1, whereby the chlorin is continually drawn from the source thereof through the inlet pipe 9 to the box 1. The chlorin supplied by the inlet pipe 9 is drawn through both of the cascades or sheets of the descending solution by the action of the aspirator pipe 11, thereby insuring effective contact of the chlorin with the liquid, the chlorin being absorbed by the liquid as it is thus exposed in said cascades and in passing over the deflector 6, and any chlorin which is not absorbed by the liquid in this operation is drawn through the aspirator pipe 11 to the aspirator 12 and is mixed with the solution coming from the outlet pipe 3 and is carried along with the solution through the discharge pipe 13, being either absorbed in the solution or otherwise carried along with the solution. By manipulation of suitable valves (not shown) or of the pumping means, the supply of liquid may be regulated so as to produce any desired head in the box 1 for operation of the ejector, the windows 10 permitting observation of the interior of the box to facilitate such regulation of the head of liquid therein.

The ejector in the liquid outlet pipe of the above described device, serves to produce a condition of partial vacuum in the receptacle 1, and to draw the chlorin from the electrolytic cell or other source thereof, said chlorin being absorbed in part, by the liquid exposed thereto in its passage from the receptacle, and any of the chlorin which is not so absorbed, or which is released from the liquid in passing through the apparatus, is forcibly drawn from the receptacle and mixed with and carried along with the outflowing liquid.

What I claim is:

1. An apparatus for effecting absorption of gas in a liquid comprising a casing provided with an inlet at its top and an outlet at its bottom for the liquid, a trough within the casing adapted to receive the liquid from said inlet and having overflow means adapted to distribute said liquid in a descending sheet, deflector means for deflecting said descending sheet of liquid and adapted to discharge the liquid in a second descending sheet, inlet means for the gas, said outlet for the liquid being provided with aspirating means, and pipe means connecting said aspirating means to said casing on the other side of the sheets of descending liquid from the entering gas, so that the liquid passing through said aspirating means will draw the gas through said sheets of descending liquid.

2. The combination of a receptacle provided at its upper portion with inlet means for liquid and with a trough for receiving such liquid, said trough having an overflow for distributing such liquid in a descending sheet, and said receptacle having an inlet for gas on one side of such descending sheet of liquid and an outlet for gas on the other side of said descending sheet of liquid, and an outlet for liquid at the bottom of said receptacle, an aspirator connected to said outlet for liquid, and an aspirating pipe leading from said outlet for gas to said aspirator, to cause gas to be drawn from said gas inlet through the descending sheet of liquid to the gas outlet, through said aspirating pipe and mixed with the liquid at the aspirator.

In testimony whereof I have hereunto set my hand, at Winona, Michigan, this 5th day of February, 1916.

HENRY BYRON SLATER.

Copies of this patent may be obtained for five cents each, by addressing the "Commissioner of Patents, Washington, D. C."